United States Patent
Randolph

(10) Patent No.: US 9,877,374 B2
(45) Date of Patent: Jan. 23, 2018

(54) LIGHTING APPARATUS AND METHODS PROVIDING VARIABLE ILLUMINATION CHARACTERISTICS BASED ON OBJECT DETECTION

(71) Applicant: Cree, Inc., Durham, NC (US)

(72) Inventor: David N. Randolph, Wake Forest, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/553,082

(22) Filed: Nov. 25, 2014

(65) Prior Publication Data

US 2016/0150614 A1    May 26, 2016

(51) Int. Cl.
*H05B 33/08*    (2006.01)
*H05B 37/02*    (2006.01)
(Continued)

(52) U.S. Cl.
CPC ..... *H05B 37/0227* (2013.01); *H05B 33/0827* (2013.01); *H05B 33/0857* (2013.01);
(Continued)

(58) Field of Classification Search
CPC ............. F21Y 2101/00; F21Y 2105/10; F21Y 2115/10; F21S 48/1154; F21S 48/1747; F21S 48/1159; F21S 48/1258; F21S 48/1163; F21S 48/1233; F21S 48/145; F21S 48/1131; F21S 48/1241; F21S 48/1275; F21S 48/1291; F21S 48/1323; F21S 48/1329; F21S 48/328; F21S 48/34; F21S 4/28; F21K 9/00; F21K 9/23; B60Q 2300/056; B60Q 2300/41; B60Q 1/04; B60Q 1/1423; H05B 33/0803;
(Continued)

(56) References Cited

U.S. PATENT DOCUMENTS 6,936,968 B2    8/2005  Cross et al.
7,507,001 B2    3/2009  Kit
(Continued)

FOREIGN PATENT DOCUMENTS

JP          2 921404 B2      7/1999
WO    WO 2006/056814 A1     6/2006
(Continued)

OTHER PUBLICATIONS

International Preliminary Report on Patentability Corresponding to International Application No. PCT/US2014/017951; dated Sep. 11, 2015; 8 Pages.
(Continued)

*Primary Examiner* — Douglas W Owens
*Assistant Examiner* — Borna Alaeddini
(74) *Attorney, Agent, or Firm* — Myers Bigel, P.A.

(57) ABSTRACT

A system includes at least one light-emitting device configured to be mounted on a stationary structure, such as a lighting pole or parking structure. A control circuit is operatively coupled to the at least one light-emitting device and configured to detect an object in a vicinity of the at least one light-emitting device and to vary a characteristic of illumination produced by the at least one light-emitting device responsive to the detection of the object.

26 Claims, 8 Drawing Sheets

(51) Int. Cl.
- *F21S 8/08* (2006.01)
- *F21S 2/00* (2016.01)
- *F21W 131/103* (2006.01)
- *F21Y 105/00* (2016.01)

(52) U.S. Cl.
CPC ............ H05B 33/0863 (2013.01); *F21S 2/00* (2013.01); *F21S 8/088* (2013.01); *F21W 2131/103* (2013.01); *F21Y 2105/00* (2013.01)

(58) Field of Classification Search
CPC ............ H05B 33/0818; H05B 33/0827; H05B 33/0857; H05B 33/0863; H05B 33/10; H05B 37/02; H05B 37/0254; H05B 37/029
USPC ........................ 315/149, 158, 291, 307, 312; 340/539.26, 540, 541, 545.3, 555, 573.2
See application file for complete search history.

(56) References Cited

U.S. PATENT DOCUMENTS

| | | | | |
|---|---|---|---|---|
| 7,547,126 B2 * | 6/2009 | Hiratsuka | ............... | F21S 2/005 362/241 |
| 8,874,312 B2 * | 10/2014 | Park | ........................ | B60Q 1/143 315/82 |
| 8,901,846 B2 * | 12/2014 | Routledge | .......... | H05B 37/0227 315/291 |
| 2004/0143380 A1 * | 7/2004 | Stam | ...................... | B60Q 1/085 701/36 |
| 2007/0295891 A1 | 12/2007 | Wang et al. | | |
| 2008/0266849 A1 | 10/2008 | Nielson et al. | | |
| 2009/0160363 A1 | 6/2009 | Negley et al. | | |
| 2010/0001652 A1 * | 1/2010 | Damsleth | ........... | H05B 37/0227 315/149 |
| 2010/0164384 A1 | 7/2010 | Ku et al. | | |
| 2010/0265100 A1 * | 10/2010 | Jalbout | .............. | H05B 37/0227 340/932.2 |
| 2011/0169410 A1 | 7/2011 | Dassanayake et al. | | |
| 2011/0291564 A1 | 12/2011 | Huang | | |
| 2012/0032594 A1 | 2/2012 | Hagner | | |
| 2012/0268034 A1 * | 10/2012 | Karasawa | .......... | H05B 37/0272 315/297 |
| 2012/0306375 A1 | 12/2012 | van de Ven | | |
| 2013/0009553 A1 * | 1/2013 | Lee | .................... | H05B 33/0824 315/153 |
| 2013/0147368 A1 | 6/2013 | McCavit et al. | | |
| 2013/0173157 A1 * | 7/2013 | Bellesfield | ......... | G01C 21/3476 701/533 |
| 2014/0175978 A1 * | 6/2014 | Kobayashi | ........... | F21S 48/1195 315/82 |
| 2014/0191682 A1 * | 7/2014 | Pederson | .......... | H04B 10/1143 315/294 |
| 2014/0239808 A1 | 11/2014 | Nava et al. | | |
| 2015/0173157 A1 * | 6/2015 | Setomoto | ........... | H05B 37/0227 315/153 |

FOREIGN PATENT DOCUMENTS

| | | |
|---|---|---|
| WO | WO 2009/059464 A1 | 5/2009 |
| WO | WO 2012/048436 A1 | 4/2012 |

OTHER PUBLICATIONS

International Search Report and Written Opinion Corresponding to International Application No. PCT/US2014/017951; dated Apr. 15, 2014; 11 Pages.

European Search Report Corresponding to European Application No. 14 75 7376; dated Sep. 9, 2016; 8 Pages.

* cited by examiner

LIGHTING APPARATUS AND METHODS PROVIDING VARIABLE ILLUMINATION CHARACTERISTICS BASED ON OBJECT DETECTION

BACKGROUND

The present inventive subject matter relates to lighting apparatus and methods and, more particularly, to lighting apparatus and methods for environments populated by objects such as vehicles and pedestrians.

Solid-state lighting arrays are used for a number of lighting applications. Solid-state lighting devices are commonly used, for example, in lighting fixtures, including task lighting, recessed light fixtures, ceiling mounted troffers and the like. Solid-state lighting panels are also commonly used as backlights for small liquid crystal display (LCD) screens, such as LCD display screens used in portable electronic devices, and for larger displays, such as LCD television displays.

Solid-state lighting devices may be attractive for retrofit/replacement applications, where devices such as LEDs may offer improved energy efficiency, reduced heat generation, extended life and desired performance characteristics, such as certain color and/or color rendering capabilities. For example, LED bulbs are commonly used to replace incandescent bulbs in down lights and other applications to reduce energy consumption and increase time between replacements. LED-based replacements for fluorescent lamps have also been developed.

LED lighting arrays are widely used for outdoor lighting applications, such as in streetlights and lights for parking lots and garages, where LEDs can provide substantially greater energy efficiency and lighting quality in comparison to more conventional light sources, such as high-intensity discharge (HID) lamps. LED fixtures may be used in new outdoor installations or LED replacement lamps or kits may be used to replace older technology lamps in existing outdoor fixtures.

A common problem associated with outdoor lighting is the generation of glare. For example, glare from streetlights or parking structure lights may negatively affect driver vision and interfere with perception of other vehicles and pedestrians. Techniques for reducing glare in outdoor lighting applications are described, for example, in U.S. Patent Application Publication No. 2014/0239808 (application Ser. No. 13/777,804), entitled "GLARE-REACTIVE LIGHTING APPARATUS," filed Feb. 26, 2013 and assigned to the assignee of the present application.

SUMMARY

Some embodiments of the inventive subject matter provide a system including at least one light-emitting device configured to be mounted on a stationary structure, such as a lighting pole or parking structure. A control circuit is operatively coupled to the at least one light-emitting device and configured to detect an object in a vicinity of the at least one light-emitting device and to vary a characteristic of illumination produced by the at least one light-emitting device responsive to the detection of the object. In some embodiments, the control circuit may be configured to vary an intensity of light emitted by the at least one light-emitting device in a selected direction responsive to the detection of the object. For example, the control circuit may be configured to reduce light emission towards the object.

In some embodiments, the at least one light-emitting device may be configured to illuminate a driving surface, and the control circuit may be configured to detect movement of a vehicle on the driving surface towards the at least one light-emitting device and to responsively vary the intensity of the light emitted by the at least one light-emitting device in the selected direction responsive to detection of the movement of the vehicle. The control circuit may be configured to cause the at least one light-emitting device to transition from a first illumination pattern to a second illumination pattern responsive to detecting movement to a first location and to return to providing the first illumination pattern responsive to detecting movement of the vehicle to a second location.

In some embodiments, the at least one light-emitting device may include an LED luminaire. The LED luminaire may include a plurality of LEDs and the control circuit may be configured to selectively vary emission from the plurality of LEDs responsive to the detection of the object.

In further embodiments, the control circuit may be configured to vary a color of light emitted by the at least one light-emitting device responsive to the detection of the object.

Further embodiments provide a system including at least one LED luminaire configured to be mounted on a stationary structure and a control circuit configured to selectively illuminate LEDs of the at least one LED luminaire to vary an intensity of light emitted by the at least one LED luminaire in a selected direction. The control circuit may be configured to detect an object in a vicinity of the at least one LED luminaire and to vary the intensity of the light emitted by the at least one LED luminaire in the selected direction responsive to the detection of the object.

Some embodiments provide a system including a plurality of luminaires located at respective stationary positions and a control circuit operatively coupled to the plurality of luminaires and configured to vary an intensity of illumination produced by the luminaires in at least one selected direction responsive to detection of movement of objects in relation to the luminaires. The plurality of luminaires may include a plurality of streetlights and the objects may include vehicles. In further embodiments, the plurality of luminaires may include a plurality of parking structure lights and the objects may include vehicles. In some embodiments, the plurality of luminaires may include a plurality of LED luminaires and the control circuit may be configured to selectively illuminate LEDs within the LED luminaires to vary the intensity of the illumination produced by the LED luminaires in the at least one selected direction.

Still further embodiments provide methods including detecting an object in a vicinity of at least one light-emitting device mounted on a stationary structure and varying a characteristic of illumination produced by the at least one light-emitting device responsive to detecting the object. Varying a characteristic of illumination produced by the at least one light-emitting device responsive to detecting the object may include varying an intensity of light emitted by the at least one light-emitting device in a selected direction responsive to detecting the object. Varying an intensity of light emitted by the at least one light-emitting device in a selected direction responsive to detecting the object may include reducing light emission towards the object. The at least one light-emitting device may include an LED luminaire including a plurality of LEDs and varying an intensity of light emitted by the at least one light-emitting device in a selected direction responsive to detecting the object may include selectively varying emission from the plurality of LEDs responsive to detecting the object. In some embodiments, varying a characteristic of illumination produced by the at least one light-emitting device responsive to detecting the object may include varying a color of light emitted by the at least one light-emitting device responsive to detecting the object.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter.

DETAILED DESCRIPTION

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

Some embodiments of the inventive subject matter arise from a realization that illumination characteristics of a stationary lighting device, such as a streetlight or parking structure light, may be varied in response to detection of objects in the vicinity of the lighting device to improve human visibility by reducing glare or other undesirable effects. For example, some embodiments may provide lighting systems that vary a directionality and/or a color of light produced by a street light or parking garage luminaire responsive to detection of a vehicle approaching the luminaire, such that glare presented to the vehicle driver may be reduced. The variation of illumination characteristics may be further conditioned on other parameters, such as weather, traffic volumes, and the like. Further embodiments provide systems with similar capabilities for walkway, stairwell or other pedestrian lighting applications.

Figure 1:
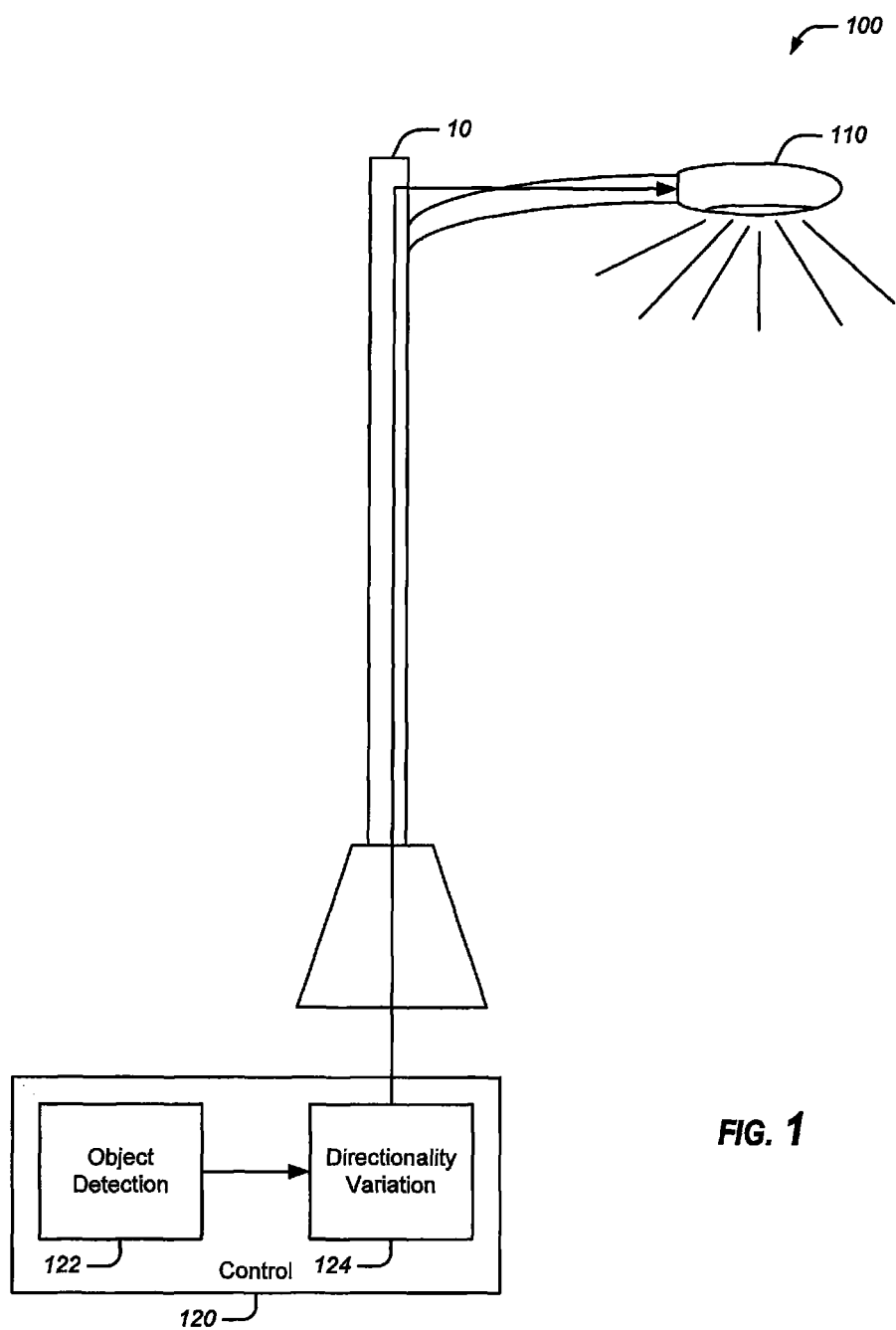
FIG. 1 illustrates a street lighting system according to some embodiments.

FIG. 1 illustrates a lighting system 100 according to some embodiments of the inventive subject matter. The system 100 includes at least one light-emitting device, here illustrated as a luminaire 110 mounted on a pole 10. The luminaire 110 may be used, for example, for street lighting or parking lot lighting. The luminaire 110 is controlled by a control circuit 120. The control circuit 120 may be co-located with the luminaire 110, e.g., mounted within a housing of the luminaire 110 and/or within a housing or other structure associated with the pole 10, such as in a housing at a base of the pole. Some or all of the components of the control circuit 120 may be remote from the luminaire 110, for example, they may be part of a lighting control unit configured to control multiple luminaires and linked thereto by wires or fiber optic links, or wirelessly linked using, for example, radio signals.

As shown, the control circuit 120 includes an object detection circuit 122, which is configured to detect objects in relation to the luminaire 110. The object detection circuit 122 may include, for example, a detector positioned at or near the luminaire 110 and configured to detect the presence of stationary objects (e.g., buildings, walls, etc.) and/or moving objects (e.g., vehicles, persons, etc.) in the vicinity of the luminaire 110. Such object presence detection may involve the use of any of a variety of object-detection techniques. For example, infrared or ultrasonic motion detectors may be used to detect the presence of moving object and/or image pattern recognition techniques may be used to discriminate the presence of particular types of objects (e.g., vehicles). The object detection circuit 122 may be configured to generate any of a variety of different types of object-related information, such as information relating to speed and direction of movement of objects, rates of objects moving along particular directions, traffic densities of moving objects and the like.

The control circuit 120 further includes a directionality variation circuit 124 configured to control a directionality of light produced by the luminaire 110 responsive to object-related information received from the object detection circuit 122. For example, in some embodiments, the directionality variation circuit 124 may cause momentary attenuation and/or intensification of light emitted from the luminaire 110 in certain directions in response to detection of an oncoming vehicle or other object such that, for example, glare towards the oncoming object is diminished. In some embodiments, the directionality variation circuit 124 may cause dimming towards static objects, such as buildings, detected in the vicinity of the luminaire 110. Such capability may be used, for example, to provide automatic tailoring of lighting patterns when installing the luminaire 110. The directionality variation circuit 124 may be further configured to provide different directionality depending on the nature of the object-related information received from the object detection circuit 122. For example, the directionality variation circuit 124 may be configured to provide different illumination patterns in response to detection of a pedestrian versus detection of a vehicle. The directionality variation circuit 124 may also be configured to control directionality of emitted light based on information in addition to object-detection information, such as information relating to weather or other conditions that may affect glare. Such information may be used, for example, to vary responses to object-detection information.

Figure 2:
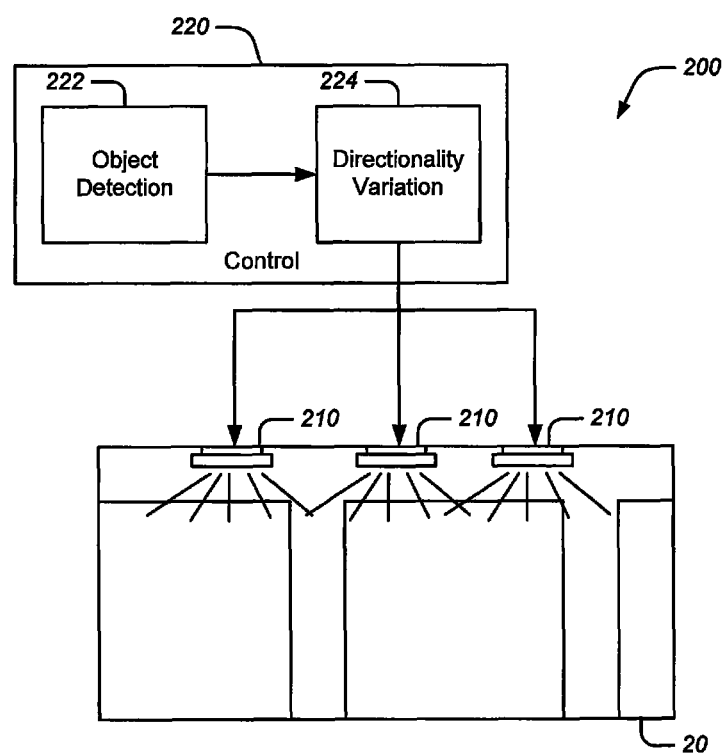
FIG. 2 illustrates a parking garage lighting system according to further embodiments.

Embodiments of the inventive subject matter may be used in lighting applications other than street lighting. For example, FIG. 2 illustrates a lighting system 200 including a plurality of luminaires 210 mounted on the ceiling of a parking structure 20. The system may further include a control circuit 220 including an object detection circuit 222 and a directionality variation circuit 224 along lines described above. Such a system may be configured, for example, to reduce glare from the luminaires 210 toward oncoming vehicles and/or pedestrians, thus potentially improving visibility. It will be appreciated that embodiments of the inventive subject matter may be used for other types of indoor and/or outdoor lighting, such as in stairwells or along sidewalks. For example, in some applications, motion detectors or other sensors may be used to detect mass pedestrian movement in a stairwell or corridor and modify illumination patterns of lighting devices in the stairwell or corridor such that, for example, light is directed in the direction of egress to aid fire escape or other emergency movements. Such directivity variation may be enabled, for example, by a fire alarm system or a building management system.

Figure 3A:
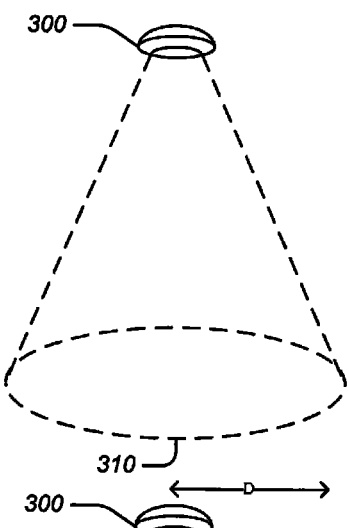
FIGS. 3A-C illustrate operations of a lighting system according to some embodiments.
Figure 3B:
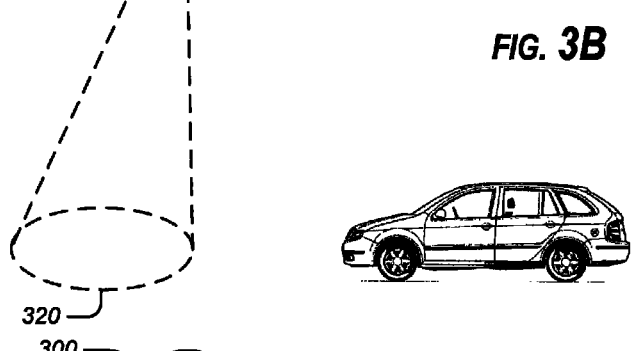
Figure 3C:
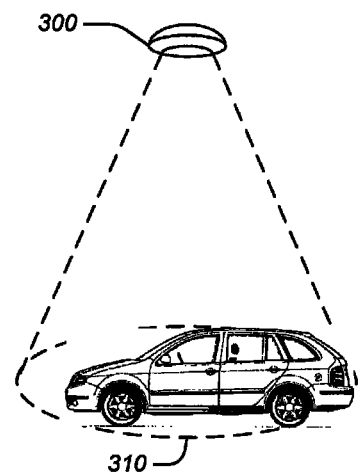

FIGS. 3A-C illustrate exemplary lighting system operations according to some embodiments. Referring to FIG. 3A, when an approaching vehicle 30 is sufficiently distant from a luminaire 300 (e.g., a streetlight), the luminaire 300 may produce light with a first directionality, producing a first illumination pattern 310 on a driving surface 40. The first illumination pattern 310 may be a default pattern that, for example, produces desirable illumination for pedestrian vision, security and/or aesthetic purposes. Referring to FIG. 3B, a control circuit associated with the luminaire 300 may detect when the approaching vehicle 30 is within a distance D of the luminaire 300, e.g., at or near a location at which light from the luminaire 300 might begin to produce glare that significantly affects the vision of the driver of the vehicle 30. In response, the control circuit of the luminaire 300 may change the directionality of light produced by the luminaire 300 to reduce light emission towards the approaching vehicle 30, resulting in a second illumination pattern 320 that may be more optimal for the driver of the vehicle, but less desirable as a default illumination pattern. Referring to FIG. 3C, when the vehicle 300 has passed a point at which light from the luminaire 300 is less likely to produce undesirable levels of glare for the driver, the control circuit may cause the luminaire 300 to return to producing the original illumination pattern 310.

According to some embodiments, LED-based lighting devices may be advantageously used to provide directionality control along the lines discussed above. LED luminaires, for example, commonly include multiple LEDs, which may be arranged, for example, in a matrix or other distributed configuration. Individual ones of the LEDs and/or groups of the LEDs may be separately controllable, e.g., they may be selectively dimmed or enhanced. According to some embodiments, this ability to selectively control elements of an LED array may be used to provide directionality control along the lines discussed above.

Figure 4:
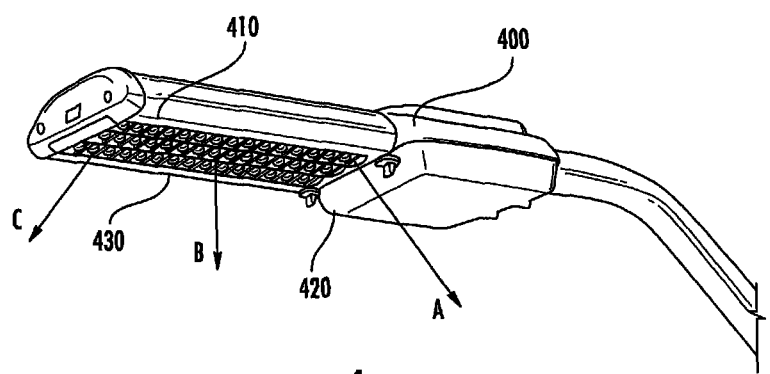
FIG. 4 illustrates a streetlight and operations thereof according to some embodiments.
Figure 5:
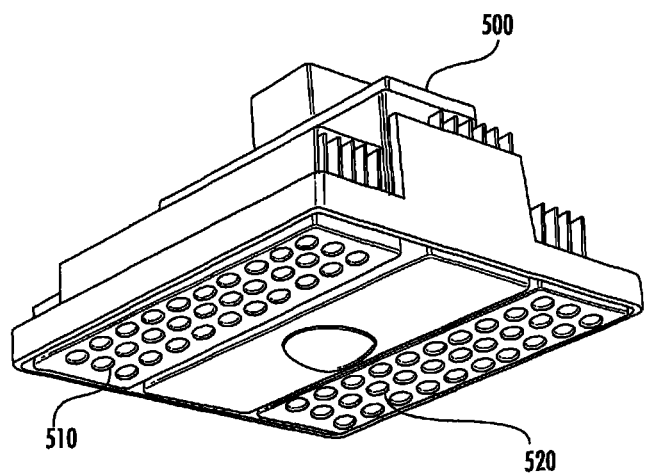
FIG. 5 illustrates a parking structure light and operations thereof according to some embodiments.

FIG. 4 illustrates an example of an LED streetlight luminaire 400, which includes sets 410, 420, 430 of LEDs. The LED sets 410, 420, 430 may be laterally arrayed as shown, and also may be positioned to direct illumination along different directions, such as the directions A, B, C shown. According to some embodiments, a control circuit, such as the control circuits described above with reference to FIGS. 1-3, may be configured to selectively illuminate the first, second and third sets 410, 420, 430 of LEDs of the luminaire 400 to provide directionality control. For example, if a vehicle is approaching the luminaire, the first set 410 of the LEDS closest to the oncoming vehicle may be dimmed to reduce light emission in the direction of the oncoming vehicle, while maintaining or increasing illumination of the other sets 420, 430. As the vehicle passes beneath the luminaire 400 and the likelihood of producing glare that may affect the vehicle's driver is reduced, the sets 410, 420, 430 may be returned to their previous state. FIG. 5 illustrates an example of an LED parking structure luminaire 500 that includes subsets 510, 520 that may be selectively illuminated in a similar manner to provide directionality control.

Figure 6:
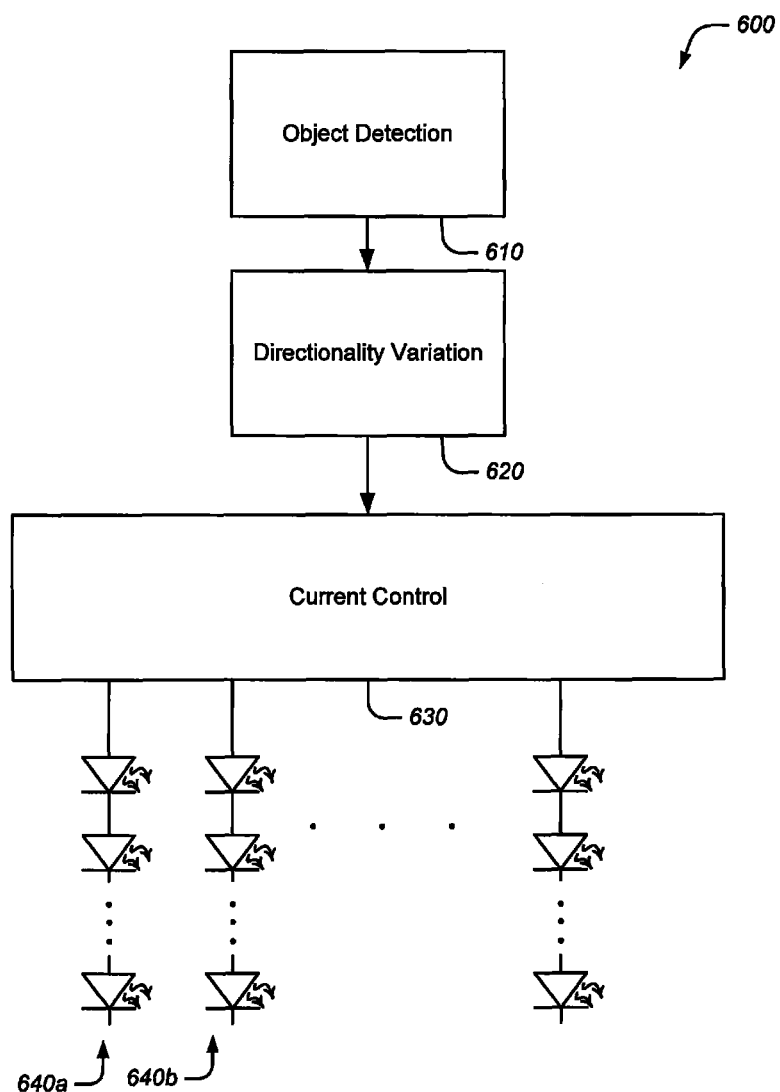
FIG. 6 illustrates an LED lighting system with selective lighting element control according to some embodiments.

FIG. 6 illustrates an example circuit arrangement that may be used to control a LED lighting device in the manner described above with reference to FIGS. 4 and 5. An LED lighting system 600 includes a plurality of strings 640a, 640b, . . . , 640n of LEDs. The strings 640a, 640b, . . . , 640n may correspond, for example, to respective rows of LEDs in a matrix-type arrangement such as those illustrated in FIGS. 4 and 5. A current control circuit 630 is configured to control currents flowing through respective ones of the LED strings 640a, 640b, . . . , 640n. A directionality variation circuit 620 may be configured to cause the current control circuit 630 to selectively vary these currents vary directionality of light produced by the strings 640a, 640b, . . . , 640n, e.g., by selectively increasing and/or decreasing currents passing through the respective strings 640a, 640b, . . . , 640n to vary the intensity of the light outputs thereof. The directionality variation circuit 620 may operate responsive to an object detection circuit, as discussed above.

Figure 7:
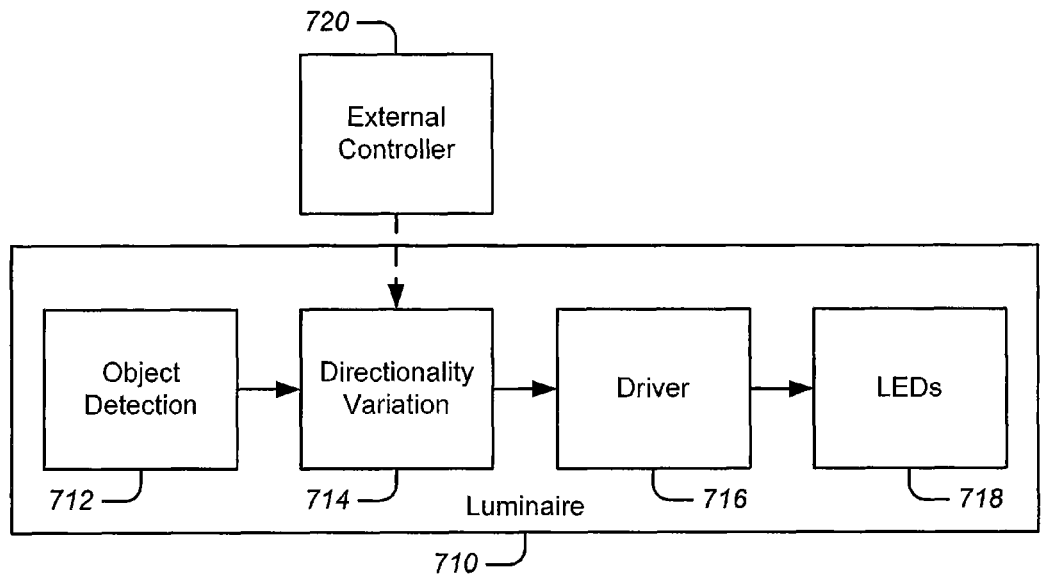
FIG. 7 illustrates a luminaire with integrated directionality control according to some embodiments.

Embodiments of the inventive subject matter may be arranged in any of a number of different ways. For example, as shown in FIG. 7, and object detection circuit 712 and a directionality variation circuit 714 may be integrated with LEDs 718 and an associated driver circuit 716 within a luminaire 710. The directionality variation circuit 718 may be configured to communicate with an external controller, such as a controller of a traffic or building management system.

Figure 8:
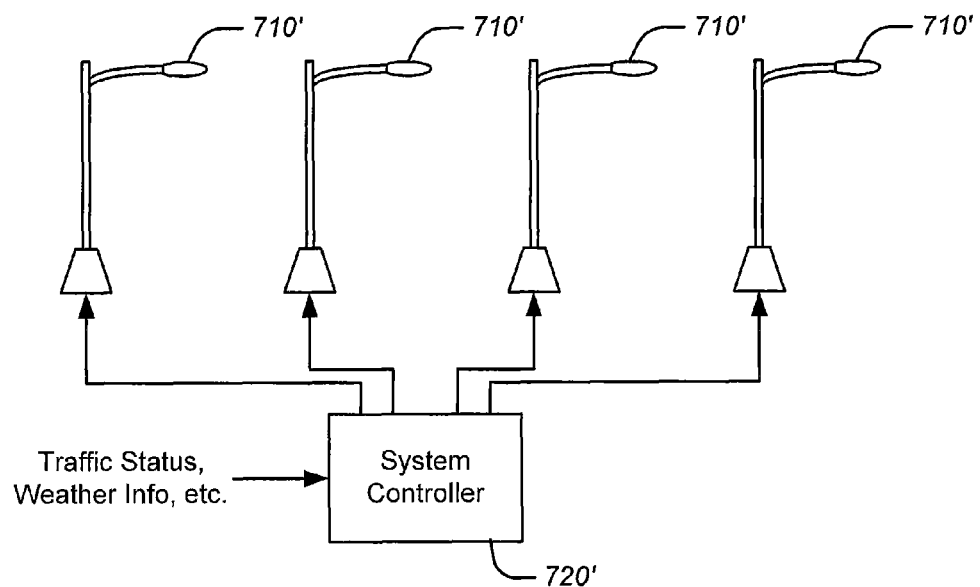
FIG. 8 illustrates control of roadway luminaires with directionality control according to further embodiments.

As shown in FIG. 8, for example, multiple ones of such luminaires 710' used in a street lighting system may be coupled to a system controller 720'. The system controller 720' may be configured to provide further control of the directionality control circuitry of the luminaires 710' in response to information such as current traffic conditions, weather conditions, and the like. For example, for heavy traffic volumes, the system controller 720' may cause the luminaires 710' to forego varying directionality in response to approaching vehicles, as high traffic rates and/or low aggregate vehicle speeds due to congestion may render such variations ineffective and/or undesirable. Similarly, the system controller 720' may only enable directionality control by the luminaires 710' under certain weather conditions that are particularly prone to glare (e.g., rain or snow). In some embodiments, object detection and/or directionality control circuitry may be located apart from a luminaire that it controls. For example, such circuitry may be included in a lighting system controller configured to control multiple distributed luminaires in a street light system using motion sensors positioned along a roadway apart using structures other than street light poles.

Figure 9:
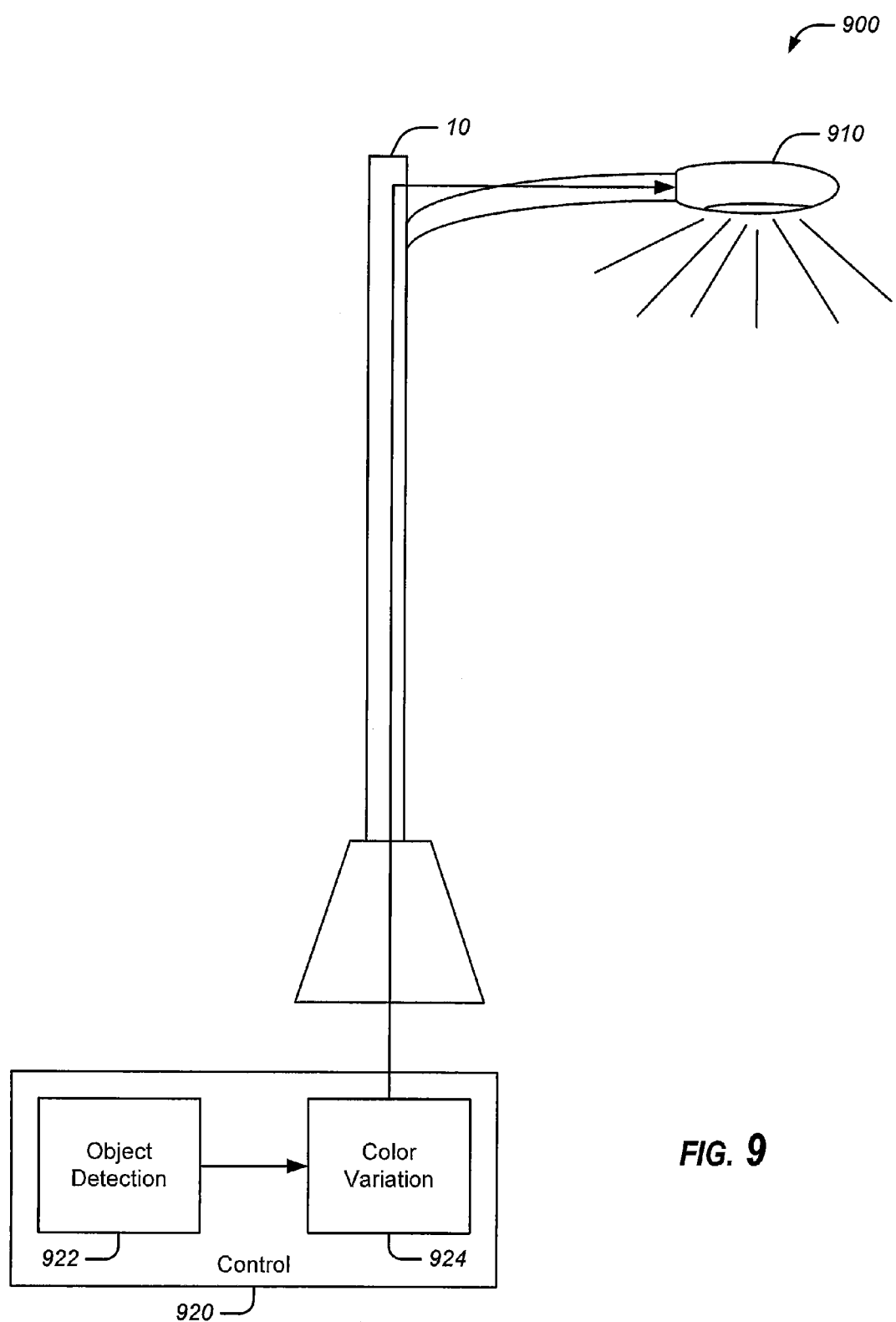
FIG. 9 illustrates a street lighting system with adaptive color control according to some embodiments.

According to further aspects, other illumination characteristics, such as color, may be varied responsive to object detection to provide similar glare reduction. For example, FIG. 9 illustrates a lighting system 900 including a pole-mounted luminaire 910. The luminaire 910 is controlled by a control circuit 920. The control circuit 920 includes an object detection circuit 922, which is configured to detect objects in relation to the luminaire 910. The control circuit 920 further includes a color variation circuit 924 configured to control a color of light produced by the luminaire 910 responsive to object-related information received from the object detection circuit 922. For example, in some embodiments, the color variation circuit 924 may cause momentary variation of the color of light emitted from the luminaire 910 in response to detection of an oncoming vehicle or other object such that, for example, glare towards the oncoming object is diminished by changing a color temperature of light produced by the luminaire 910. This variation of color may be performed on selected groups of light emitting devices (e.g., LEDs) of the luminaire 910, such as a group or groups nearest the oncoming vehicle or other object. It will be appreciated that such color control may also be combined with directionality control along the lines described above. For example, a color produced by a lighting device may be varied concurrent with changing an illumination pattern produced by the device by selectively attenuating and/or increasing light output of the light emitters of the device.

Figure 10:
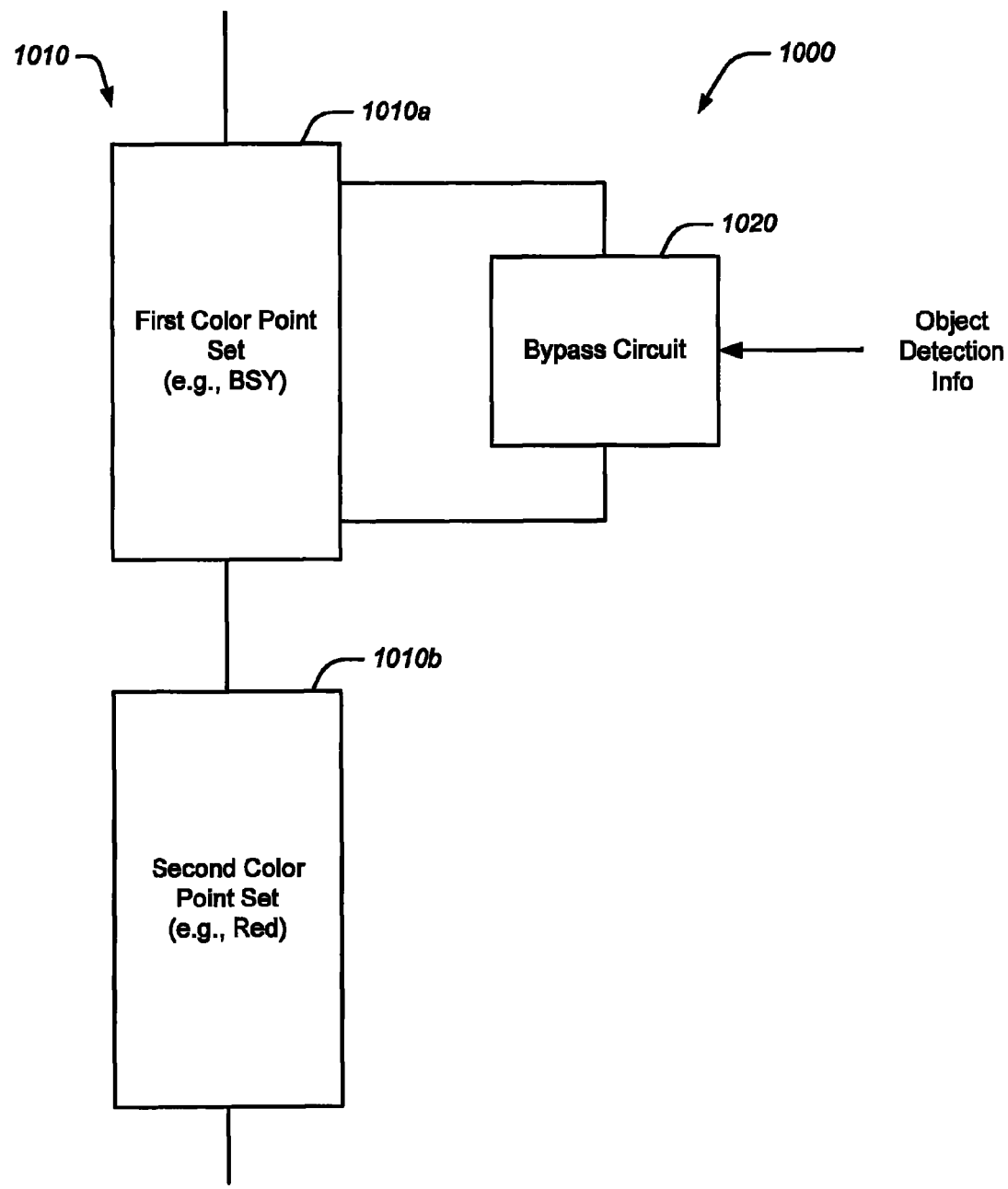
FIG. 10 illustrates an LED lighting circuit with color control according to some embodiments.

FIG. 10 illustrates an arrangement for color control in an LED apparatus 1000 according to further embodiments. The lighting apparatus 800 includes a string 1010 of LEDs, including a first set of LEDs 1010a having a first color point (e.g., blue-shifted yellow (BSY)) and a second set of LEDs 1010b having a second color point (e.g., red). The apparatus 1000 may include at least one bypass circuit 1020, which is configured to selectively bypass current around LEDs in the string 1010 to produce a desired color output. As shown, the bypass circuit 1020 may operate responsive to object detection information to provide color variation as discussed above. Various techniques for color control in LED lighting apparatus are described in U.S. Patent Application Publication No. 2009/0160363 to Negley et al. and U.S. Patent Application Publication No. 2012/030375 to van de Ven et al., the disclosures of which are incorporated herein by reference in their entirety.

Embodiments of the inventive subject matter may be illustrated and described herein in any of a number of patentable classes or contexts including any new and useful process, machine, manufacture, or composition of matter, or any new and useful improvement thereof. Accordingly, some embodiments of the inventive subject matter may be implemented in hardware or as combinations of software and hardware that may all generally be referred to herein as a "circuit," "circuitry," "module," "component," and/or "system." Furthermore, some embodiments of the inventive subject matter may take the form of a computer program product comprising one or more computer readable media having computer readable program code embodied thereon. It will be appreciated that such computer code may be stored in a computer readable storage medium integrated within a computing device, such as a microprocessor or microprocessor, within a memory device coupled to such a computing device, and/or in a computer accessible location, such as a website. Generally, computer readable media may include, but is not limited to, electronic, magnetic, optical, electromagnetic, or semiconductor system, apparatus, or device, or any suitable combination of the foregoing.

Embodiments of the inventive subject matter are described herein with reference to block diagrams and other types of illustrations depicting methods, apparatus, and computer program products. It will be understood that various blocks of block diagrams, and combinations of blocks in block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the disclosure.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or otherwise structured to do so. As used herein, the term "and/or" or "/" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. When a third element "couples" first and second elements, additional intervening elements may be present between the third element and the respective first and second elements. It will be further understood that elements "coupled in series" or "serially connected" may be directly coupled or may be coupled via intervening elements.

The expression "lighting apparatus", as used herein, is not limited, except that it indicates that the device is capable of emitting light. For example, lighting apparatus can include, but is not limited to, devices that illuminate areas or volumes (e.g., structures, vehicles, signage, vessels, electronic devices, aircraft, landscape elements, topographic and geological features, etc.), bulbs and bulb replacements, outdoor and security lights, residential lights, commercial lights, industrial lights, task lights, specialty lights and any other light emitting devices or systems.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The corresponding structures, materials, acts, and equivalents of any means or step plus function elements in the claims below are intended to include any disclosed structure, material, or act for performing the function in combination with other claimed elements as specifically claimed. The description of various embodiments of the inventive subject matter herein has been presented for purposes of illustration and description, but is not intended to be exhaustive or limited to the forms disclosed. Many modifications and variations will be apparent to those of ordinary skill in the art without departing from the scope and spirit of the disclosure.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A system comprising:
   a plurality of light emitting devices (LEDs) configured to be mounted on a stationary structure; and
   a control circuit operatively coupled to the plurality of LEDs configured to detect an object in a vicinity of the plurality of LEDs and to vary a directionality of illumination produced by the plurality of LEDs responsive to the detection of the object by selectively controlling current to the plurality of LEDs,
   wherein the control circuit is configured to reduce light emission towards the detected object of a first subset of the plurality of LEDs while increasing illumination of a second subset of the plurality of LEDs.

2. The system of claim 1, wherein the control circuit is configured to vary an intensity of light emitted by the second subset of the plurality of LEDs of the plurality of LEDs in a selected direction responsive to the detection of the object.

3. The system of claim 2, wherein the control circuit is configured to discriminate moving objects from stationary objects.

4. The system of claim 2, wherein the plurality of LEDs are configured to illuminate a driving surface, and wherein the control circuit is configured to detect movement of a vehicle on the driving surface towards the plurality of LEDs and to responsively vary the intensity of the light emitted by the plurality of LEDs in the selected direction responsive to detection of the movement of the vehicle.

5. The system of claim 4, wherein the control circuit is configured to cause the plurality of LEDs to transition from a first illumination pattern to a second illumination pattern responsive to detecting movement of the vehicle to a first location and to return to providing the first illumination pattern responsive to detecting movement of the vehicle to a second location.

6. The system of claim 1, wherein the stationary structure comprises a lighting pole or a parking structure.

7. The system of claim 1, wherein the plurality of LEDs are within an LED luminaire.

8. The system of claim 7, wherein the control circuit is configured to vary the directionality of light produced by the LED luminaire by selectively varying emission from the plurality of LEDs responsive to the detection of the object.

9. The system of claim 1, wherein the control circuit is configured to vary a color of light emitted by the first subset of the plurality of LEDs towards the detected object responsive to the detection of the object without varying a color of light emitted by the second subset of the plurality of LEDs.

10. The system of claim 1, wherein the control circuit is configured to direct a pattern of illumination produced by the plurality of LEDs responsive to the detection of the object.

11. The system of claim 10, wherein the control circuit is configured to direct the pattern of illumination away from the detected object responsive to the detection of the object.

12. The system of claim 1, wherein the first subset of the plurality of LEDs is closer to the detected object than the second subset of the plurality of LEDs.

13. A system comprising:
   at least one light emitting device (LED) luminaire comprising a plurality of LEDs configured to be mounted on a stationary structure;
   a control circuit configured to selectively illuminate LEDs of the at least one LED luminaire to vary a directionality of light emitted by the at least one LED luminaire by selectively driving at least one of the plurality of LEDs of the at least one LED luminaire,
   wherein the control circuit is configured to detect an object in a vicinity of the at least one LED luminaire and to reduce light emission towards the detected object responsive to the detection of the object,
   wherein a first LED of the plurality of LEDs is configured to direct illumination in a first direction, and
   wherein a second LED of the plurality of LEDs is configured to direct illumination in a second direction, different from the first direction, and
   wherein the control circuit is configured to vary the directionality of the light emitted by the at least one LED luminaire by decreasing a first intensity of light emitted from the first LED and increasing a second intensity of light emitted from the second LED.

14. The system of claim 13, wherein the control circuit is configured to detect movement of the object.

15. The system of claim 13, wherein the at least one LED luminaire is configured to illuminate a driving surface, and wherein the control circuit is configured to detect movement of a vehicle along the driving surface towards the at least one LED luminaire and to vary the intensity of the light emitted by the at least one LED luminaire in a selected direction responsive to detection of the movement of the vehicle.

16. The system of claim 13, wherein the stationary structure comprises a lighting pole or a parking structure.

17. The system of claim 13, wherein the control circuit is configured to reduce light emission towards the detected object of the first subset of the LEDs of the at least one LED luminaire while increasing illumination of the second subset of the LEDs of the at least one LED luminaire.

18. A system comprising:
   a plurality of LED luminaires located at respective stationary positions wherein respective ones of the plurality of LED luminaires comprise a plurality of light emitting devices (LEDs); and
   a control circuit operatively coupled to the plurality of LED luminaires and configured to vary a directionality of illumination produced by the LED luminaires responsive to detection of movement of objects in relation to the LED luminaires by selectively controlling current to at least one of the plurality of LED luminaires,
   wherein varying the directionality of the illumination produced by the LED luminaires comprises selectively varying a color of light emitted by a first subset of the plurality of LEDs of one of the plurality of LED luminaires responsive to the detection of the movement of the objects without varying a color of light emitted by a second subset of the plurality of LEDs of the one of the plurality of LED luminaires.

19. The system of claim 18, wherein the plurality of luminaires comprises a plurality of streetlights and wherein the objects comprise vehicles.

20. The system of claim 18, wherein the plurality of luminaires comprises a plurality of parking structure lights and the objects comprise vehicles.

21. A method comprising:
   detecting an object in a vicinity of a plurality of light-emitting devices (LEDs) mounted on a stationary structure; and
   varying a directionality of illumination produced by the plurality of LEDs by selectively driving the plurality of LEDs responsive to detecting the object,
   wherein varying the directionality of the illumination produced by the plurality of LEDs comprises selectively varying a color of light emitted by a first subset of the plurality of LEDs towards the detected object responsive to the detection of the object without varying a color of light emitted by a second subset of the plurality of LEDs.

22. The method of claim 21, wherein varying a directionality of illumination produced by the at least one light-emitting device responsive to detecting the object further comprises varying an intensity of light emitted by the plurality of LEDs in a selected direction responsive to detecting the object.

23. The method of claim 22, wherein varying an intensity of light emitted by the plurality of LEDs in a selected direction responsive to detecting the object further comprises reducing light emission towards the object.

24. The method of claim 22, wherein the object comprises a vehicle.

25. The method of claim 22, wherein the stationary structure comprises a lighting pole or a parking structure.

26. The method of claim 22, wherein the plurality of LED are within an LED luminaire.

* * * * *